United States Patent [19]
Klier et al.

[11] Patent Number: 6,143,820
[45] Date of Patent: Nov. 7, 2000

[54] PREPARATION OF A LOW POLYDISPERSE WATER-SOLUBLE POLYMERIC COMPOSITION

[75] Inventors: John Klier; Thomas H. Kalantar, both of Midland; Christopher J. Tucker, Bay City; Erin D. O'Driscoll; Andrew T. Graham, both of Midland, all of Mich.

[73] Assignee: The Dow Chemical Company, Midland, Mich.

[21] Appl. No.: 09/216,209

[22] Filed: Dec. 18, 1998

[51] Int. Cl.⁷ .............................. C08F 22/02; C08J 11/16; C08J 11/22
[52] U.S. Cl. ...................... 524/556; 525/330.2; 525/387; 525/329.5; 525/329.6
[58] Field of Search ................. 524/556; 525/330.2, 525/387, 329.5, 329.6

[56] References Cited

U.S. PATENT DOCUMENTS

| | | |
|---|---|---|
| 4,507,422 | 3/1985 | Farrar et al. . |
| 5,244,934 | 9/1993 | Umeda et al. ......................... 522/129 |
| 5,412,047 | 5/1995 | Georges et al. . |
| 5,629,377 | 5/1997 | Burgert et al. . |

FOREIGN PATENT DOCUMENTS

| | | |
|---|---|---|
| 0 404 377 | 12/1990 | European Pat. Off. . |
| 2 333 005 | 7/1977 | France . |
| 9721 | 1/1994 | Japan . |
| 94/20547 | 9/1994 | WIPO . |

OTHER PUBLICATIONS

Linden et al., *Coordination Chemistry Reviews*, 125, pp. 195–217, (1993).

Witiak, *Detergents and Cleaners: A Handbook for Formulations*, ed., K. Robert Lange, Hanser Publishers, Munich, Vienna, New York, pp. 113–132 (1994).

*Primary Examiner*—Donald R. Wilson
*Attorney, Agent, or Firm*—Reid S. Willis

[57] ABSTRACT

A water-soluble polymer having a low polydispersity index and controlled molecular weight can be prepared by oxidative degradation and shearing of a water-swellable crosslinked polymer or by hydrolysis of the crosslinked polymer to a high molecular weight soluble polymer, followed by oxidative degradation of the high molecular weight polymer.

7 Claims, No Drawings

PREPARATION OF A LOW POLYDISPERSE WATER-SOLUBLE POLYMERIC COMPOSITION

BACKGROUND OF THE INVENTION

The present invention relates to the preparation of a low polydispersity index water-soluble polymeric composition. Water soluble polymeric compositions such as low molecular weight polyacrylates are widely used, for example, in detergent formulations as crystal growth inhibitors, dispersants, sequestration agents, antiscalants in water treatment processes, and as dispersants in clay and mineral processing as well as in coating formulations.

Water-soluble polymeric compositions that are produced by conventional free radical polymerization methods typically have a high polydispersity index (defined by weight average molecular weight over number average molecular weight or $M_w/M_n$). Although the theoretical limit for polydispersity ($M_w/M_n$) in radical chain polymerizations is 1.5 or less, in practice the distribution is greater than 2.

The performance of water-soluble polymers can depend strongly on both their molecular weight and $M_w/M_n$. For example, detergent performance is known to depend strongly on polymer molecular weight and structure. In conventional detergents, under low temperature U.S. wash conditions, clay removal is maximized and calcium carbonate fabric encrustation is minimized when detergents are formulated using sodium polyacrylate of approximately 5000 molecular weight. Higher molecular weight polymers, which are less effective crystal growth inhibitors and clay dispersants, allow calcium carbonate deposition to increase, resulting in reduced clay cleaning performance. Thus, there is an obvious need for controlled molecular weight and low polydispersity for acrylate polymers. See Witiak in *Detergents and Cleaners: A Handbook for Formulators*, ed., K. Robert Lange, Hanser Publishers, Munich, Vienna, New York, pp. 113–132 (1994); and Zini, "Polymeric Additives for High Performing Detergents" (1995).

In another example of the desirability of low polydisperse polyacrylates, Farrar et al. (U.S. Pat. No. 4,507,422, which teachings are incorporated herein by reference) discloses that water-soluble polymeric dispersants have greatly improved pigment dispersing properties if the polymer has a $M_w/M_n$ of less than 1.5. It is presumed that fractions of the polymer with molecular weights that are too low or too high interfere with the function of the optimal molecular weight fractions by competitive absorption or dilution effects.

Farrar et al. teaches that water-soluble polyacrylates having a low $M_w$ (that is, a weight average molecular weight of about 1000 to 10,000) and low $M_w/M_n$ can be achieved by a variety of techniques including: a) using conventional polymerization methods to obtain a polymer having high polydispersity, then fractionally precipitating the polymer to obtain polymers having a polydispersity below 1.5; b) synthesizing the polymer in the presence of isopropanol as a chain regulator under closely monitored and controlled conditions; and c) preparing a water-insoluble acrylate polymer having the desired molecular weight and $M_w/M_n$, then hydrolyze the acrylate to the free acid. However, all of these approaches are labor intensive and inefficient.

In U.S. Pat. No. 5,412,047, incorporated herein by reference, Georges et al. discloses the use of the carbonyl-containing nitroxide 4-oxo-TEMPO as a free radical agent suitable for controlling the molecular weight of acrylate polymers. Georges et al. further teaches (column 13, lines 65–68 to column 14, lines 1–4) that nitroxide compounds that do not contain oxo groups, while satisfactory for the purpose of moderating the polymerization of a wide variety of different monomer types, "were completely ineffective when used in homopolymerizations of acrylate monomers (for example, n-butylacrylate.)" Presumably, the homopolymer (column 14, lines 42–45) "was sufficiently thermally unstable or the stable free radical had a sufficiently strong inhibitory effect under the reaction conditions so as to preclude homoacrylate polymer product formation."

The reaction conditions disclosed by Georges et al. are in the range of 100° C. and 180° C.; at temperatures below 100° C. (column 16, lines 13–16), "the reaction rate is slow and industrially impractical without the aid of an acid or base accelerating additive compound." At these elevated temperatures, the polymerization reactor must be equipped to operate at elevated pressure inasmuch as water is used as the solvent.

Another method for preparing low molecular weight low polydisperse acid polymers is to oxidatively degrade a soluble higher molecular weight polymer to a lower molecular weight lower polydisperse polymer, as described in EP 0404377 A1, which teachings are incorporated herein by reference. According to this publication, $M_w$ as low as 13000 and $M_w/M_n$ as low as 2.1 can be achieved by oxidation of a high molecular weight, partially neutralized acrylic acid homopolymer with hydrogen peroxide.

In view of the deficiencies in the art, it would be desirable to prepare more efficiently and under milder conditions a water-soluble polymer having controlled molecular weight and low polydispersity.

SUMMARY OF THE INVENTION

The present invention addresses a need in the art by providing a method of preparing a low polydispersity index, water-soluble polymer comprising the steps of: a) hydrolyzing a crosslinked polymer that contains covalently bonded hydrolyzable crosslinking groups to form a first water-soluble polymer; and b) oxidatively or ultrasonically degrading the first water-soluble polymer to form a second water-soluble polymer that has a lower number average and weight average molecular weight and a lower polydispersity than the first water-soluble polymer with the proviso that the crosslinked polymer is either water-swellable or contains functional groups that are hydrolyzable to the extent that the first polymer can be rendered water-soluble.

In another aspect, the present invention is a method of preparing a water-soluble polymer comprising the step of subjecting a water-swellable crosslinked polymer that contains covalently bonded crosslinking groups to oxidative degradation and sufficient shear to break chemical bonds.

In a third aspect, the present invention is a method of preparing a water-soluble polymer comprising the step of subjecting a water-swellable crosslinked polymer that contains partially neutralized acid groups to oxidative degradation.

In a fourth aspect the present invention is a method of preparing a low polydisperse, water-soluble polymer comprising the step of oxidatively or ultrasonically degrading and hydrolyzing a water-insoluble polymer to form a water-soluble polymer that has a lower number average and weight average molecular weight and a lower polydispersity than the first water-soluble polymer, with the proviso that the water-insoluble polymer is either a linear or crosslinked polymer that contains functional groups that are hydrolyzable to the extent that the water-insoluble polymer can be rendered water-soluble.

The present invention addresses a need in the art by providing a simple means of preparing a useful water-soluble polymer. Surprisingly, such a polymer can be prepared from a crosslinked polymer gel that might otherwise be discarded as waste.

DETAILED DESCRIPTION OF THE INVENTION

A water-soluble, low polydispersity index, low molecular weight polymer or copolymer can be prepared from a water-swellable crosslinked polymer in two ways. In a first method, the low molecular weight polymer or copolymer can be prepared in two steps. In the first step, a hydrolyzable water-swellable crosslinked polymer is hydrolyzed to a first water-soluble polymer. Preferably, the crosslinked polymer contains partially neutralized acid groups, since partial neutralization confers greater desirable water-swellability to the crosslinked polymer.

As used herein, a hydrolyzable crosslinked polymer is a polymer having crosslinking groups which can be cleaved by treatment with water, generally in the presence of an acid or a base, usually a base. Examples of hydrolyzable crosslinking groups include esters, ethers such as benzyl ethers, thioethers, acetals, ketals, anhydrides, amides, ureas, and urethanes. Preferred crosslinking groups are esters, ketals, amides, and anhydrides. More preferred crosslinking groups are esters.

The crosslinked polymer can be prepared by polymerization or grafting of a suitable polymerizable unsaturated monomer or the salt thereof, or both, in the presence of, or by subsequent reaction with a crosslinking agent. Monomers suitable for the preparation of the water-swellable polymer include those which contain acid groups, those which contain basic groups, and those which contain salts, and combinations thereof. Examples of monomers that contain acid groups include acrylic acid, methacrylic acid, maleic acid, maleic anhydride, fumaric acid, itaconic acid, crotonic acid, vinyl acetic acid, acryloxypropionic acid, 2-acrylamido-2-methyl-1-propane sulfonic acid, vinyl sulfonic acid, 2-sulfoethyl acrylate and methacrylate, 3-sulfopropyl acrylate and methacrylate, vinyl phosphonic acid, vinyl phenol, and styrene sulfonic acid, as well as salts thereof and combinations thereof.

Examples of monomers that contain basic groups include ethylenically unsaturated amines such as 2-(N,N-diethylamino)ethyl acrylate and methacrylate, N-[2-(N,N-diethylamino)ethyl] methacrylamide, 2-(diethylamino) ethylstyrene, and 2- and 4-vinlypyridine. Examples of suitable monomers that contain salt groups include the conjugate bases of the aforementioned acids, as well as amine salts and quaternary ammonium salts such as 2-methacryloxyethyltrimethylamonium chloride.

It is also possible to prepare the crosslinked polymer from a monomer which is neither an acid, a base, or a salt. An example of such a monomer is acrylamide, which can be used alone, or in combination with another suitable monomer. It is further possible to prepare a water-swellable crosslinked polymer from a non-swellable polymer if that polymer contains groups such as nitrile groups, ester groups, and benzyl ether groups, which upon hydrolysis, render the crosslinked polymer swellable. For example, a crosslinked polyacrylonitrile is not water swellable, but can become water swellable upon hydrolysis of pendant nitrile groups to either amide or acid groups.

Preferably, the water-swellable crosslinked polymer is prepared from acid monomers or the conjugate bases of acid monomers, or both. More preferably, the crosslinked polymer is prepared using a partially neutralized acid monomer.

Another monomer that does not contain an acid, a base, or a salt group can be included as comonomer with the above-mentioned monomers to the extent that the final copolymer is water-soluble. Examples of suitable comonomers include acrylate and methacrylate esters and amides, nitriles such as acrylonitrile, hydroxyalkyl acrylates and methacrylates such as 2-hydroxyethyl acrylate, and styrenes such as styrene and α-methylstyrene.

Crosslinking agents that form the hydrolyzable crosslinking groups include vinyl polymerizable monomers such as poly-allyl, -crotyl and -glycidyl ethers, and poly-acrylate and -methacrylate esters of polyhydric alcohols such as pentaerythritol, sucrose and other sugars, trimethylol propane, ethylene glycol, polyethylene glycols such as di-, tri-, tetra- and pentaethylene glycols, alkylenediols such as 1,4-butanediol, 1,2- and 1,3-propanediol, 1,6-hexanediol, bisphenols such as bisphenol A, cyclohexanedimethanol, glycerol, dipentaerythritol, di-trimethylolpropane, tris (2-hydroxyethyl) isocyanurate, and their corresponding oxy- and polyoxyethylated and -propylated derivatives; tetraalkyloxyethane; di- and triallylamines; allyl, vinyl, and crotyl acrylate and methacrylate; bisacrylamido acetic acid and its salts and ethoxylated and propoxylated analogs thereof; and glycidyl esters of polymerizable monomers.

Crosslinking agents do not have to be vinyl polymerizable monomers, however, Examples of monomers that do not contain vinyl groups include polyamines such as alkylene diamines, polyglycidyl ethers such as the diglycidyl ether of bisphenol A, polyols such as alkylene glycols, all of which can be used to crosslink a branched or linear polymer to make a water-swellable crosslinked polymer.

It is also possible that the polymerizable monomer is also crosslinkable. For example a monomer such as 2-hydroxyethyl acrylate or methacrylate can be copolymerized in the presence of an acid containing monomer to form a linear polymer that contains pendant hydroxyl groups and pendant acid groups, both of which can be subsequently esterified to form a crosslinked polymer.

Examples of suitable monomers and crosslinking agents are also disclosed in U.S. Pat. No. 5,629,377, column 4, lines 58–67, and column 5, lines 1–57, which disclosure is incorporated herein by reference. The crosslinking agents are preferably used in an amount not greater than 10 weight percent, based on the total weight of the monomers used to prepare the gel.

An example of a preferred partially neutralized crosslinked polymer, either in the dry or hydrated form, is described in U.S. Pat. No. 5,629,377 procedure 4, columns 18–19, which teachings are incorporated herein by reference. The crosslinked polymer is advantageously used as an aqueous gel. An example of a commercially available partially neutralized crosslinked polymer is DRYTECH™ superabsorbant (a trademark of The Dow Chemical Company).

In the second step, the first water-soluble polymer can then be converted to a second water-soluble polymer, which has a lower molecular weight and lower polydispersity than the first water-soluble polymer, by ultrasonication or oxidative degradation, preferably oxidative degradation. Oxidative degradation, as used herein, refers to the cleavage of bonds in the polymer backbone in the first polymer with concomitant consumption of an oxidant. Preferably, the cleaved bonds are carbon-carbon bonds or carbon-oxygen bonds.

Oxidative degradation is preferably carried out at a pH and a temperature that promote the degradation, preferably at a pH of from about 2 to about 10, and preferably at a temperature in the range of about 0° C. to about 100° C., more preferably from about 10° C. to about 90° C. Oxidative degradation of the first water-soluble polymer may be carried out in the presence of shear to enhance the cleavage of chemical bonds. Commercially available homogenizers, extruders, blenders, and the like are suitable for this purpose.

The weight-to-weight ratio of the crosslinked polymer to the oxidant varies depending on the oxidant and the polymer, but is typically not less than 0.01:1, preferably not less than 0.1:1, more preferably not less than 0.2:1, and not more than 200:1, preferably not more than 100:1, more preferably not more than 50:1, most preferably not less than 10:1.

Preferred oxidants include peroxides such as hydrogen peroxide and benzoyl peroxide; hydroperoxides such as t-butyl hydroperoxide; dialkylperoxides such as di-t-butylperoxide; hypohalites such as alkali metal hypochlorites and hypobromites; hypohalous acids such as hypochlorous, hypobromous, and hypoiodous acid; alkylhypohalites; perborates; persulfates; permanganates; halates; halic acids; perhalates; perhalic acids; peracids such as peracetic acid and performic acid; oxygen; and ozone. More preferred oxidants include hydrogen peroxide, sodium hypochlorite, potassium hypochlorite, sodium perbromate, and potassium perbromate. Most preferred oxidants are hydrogen peroxide and sodium hypochlorite.

It is well-known in the art that polymer degradation by peroxides, hydroperoxides, dialkyl peroxides, or persulfates can be facilitated photolytically, or by the addition of a catalytic amount of a transiton metal salt such as an iron or a copper salt. (See, for example, *Coordination Chemistry Reviews*, 125, pp. 195–218 (1993)). Reducing agents can also be used in conjunction with peroxides, hydroperoxides, dialkyl peroxides, or persulfates to accelerate polymer degradation. Examples of suitable reducing agents include ascorbic acid, erythorbic acid, as well as their salts and isomers, sodium thiosulfate, sodium bisulfite, and sodium hypophosphite. The use of light, transition metal salts, or reducing agents, alone or in combination, generally accelerates degradation so that oxidative degradation can be carried out in less time at the same temperature, or for the same time at a lower temperature.

The water-soluble polymer prepared by hydrolysis and oxidative degradation preferably has a $M_w$ of not greater than 12,000, more preferably not greater than 8,000, and most preferably not greater than 6,000 Daltons, and preferably not less than 1,000 Daltons.

In a second approach, the water-swellable crosslinked polymer can be directly converted to a water-soluble polymer by oxidative degradation and sufficient shear to break chemical bonds. The crosslinked polymer may or may not be hydrolyzable. Thus, the polymer may contain structural units of non-hydrolyzable crosslinking groups formed from monomers such as divinyl benzene, 1,5-hexadiene, and diallyl fumarate, as well as, or in addition to structural units of hydrolyzable crosslinking groups formed from monomers such as those exemplified hereinabove. In general, the lower percentage of solids loading in the gel, the less power required to impart the degree of shear necessary to reduce molecular weight and polydispersity of the gel. However, since it is desirable to achieve as high a solids content as possible, equipment that is capable of processing high solids level compositions is preferred.

It has surprisingly been discovered that a polymer having a polydispersity of less than 2.5, more preferably less than 2.0 can be prepared by direct oxidative degradation and shearing of a water-swellable crosslinked polymer.

The present invention is particularly useful, for example, for the conversion of a superabsorbant gel, or waste by-product of the gel from the production thereof to a highly valuable reagent that is useful as an additive for laundry and dishwashing detergents, hard surface cleaners, water treatment and oil field anti-scale agents, and further useful as a dispersant for coatings and a deflocculant.

The following examples are for illustrative purposes only and are not intended to limit the scope of this invention.

EXAMPLES 1–5

Preparation of a Low Polydisperse Partially Neutralized PAA from a Crosslinked Gel by Hydrolysis Followed by Oxidative Degradation Water (160 g) and 5.0 M NaOH (32 mL) were added to a $N_2$-purged round bottom flask equipped with a reflux condenser and an overhead stirrer. The flask was heated to 90° C., and DRYTECH™ crosslinked PAA partial sodium salt (24.4 g) was added thereto in small batches over 24 hours with stirring. The reactants were maintained at 90° C. for another 48 hours. The resultant viscous solution was cooled to room temperature, then weighed (227 g, 10% sodium polyacrylate; 88% recovery).

A portion of the viscous solution (10.4 g) was diluted with water (94 mL) and the pH was adjusted to 7 to 8 to form a diluted, but still viscous solution. Then, a portion of the diluted solution (5 mL) was placed in each of five 20-mL pressure tubes. Hydrogen peroxide solution (obtained from Fisher Scientific, catalog #H341-500, 30 weight percent) and NaOCl solution (obtained from Aldrich, catalog #23, 930-5, ≧4 weight percent available chlorine) were added in the amounts indicated in Table I. The tubes were sealed and heated for 24 hours at 90° C. to form non-viscous solutions. Residual solids were filtered off, and the samples were dried in air. Table I illustrates the effect of PAA to oxidant concentration on molecular weight and polydispersity. Volume refers to the volume of the solution containing the oxidant in mL. PAA/Ox refers to the weight-to-weight ratio of the partially neutralized polyacrylic acid to the hydrogen peroxide or NaOCl. $M_w$ and $M_n$ were determined by GPC.

TABLE I

| Volume Ox | PAA/Ox | $M_n$ | $M_w$ | $M_w/M_n$ |
|---|---|---|---|---|
| 0.05 $H_2O_2$ | 3.7 | 1340 | 2430 | 1.8 |
| 0.9 NaOCl | 1.4 | 3850 | 9900 | 2.6 |
| 1.8 NaOCl | 0.7 | 2390 | 4915 | 2.1 |
| 3.6 NaOCl | 0.35 | 1530 | 2590 | 1.7 |
| 7.2 NaOCl | 0.18 | 1110 | 1690 | 1.5 |

EXAMPLE 6

Preparation of a Low Polydisperse Partially Neutralized PAA from a Crosslinked Gel by Shear and Oxidative Degradation The partial sodium salt of a crosslinked PAA (30 weight percent in water) was prepared as described in U.S. Pat. No. 5,629,377, procedure 4, columns 18–19, which preparation is incorporated herein by reference. The salt was diluted with sufficient water and hydrogen peroxide to form a 1 weight percent solution of the salt and 0.5 weight percent solution of the peroxide. The solution was stirred with a propeller blade for 10 minutes using a Fisher Stedfast Stirrer Model SL 1200 at setting 5 to form a substantially uniform suspension. The sample was homogenized using a Polyscience X520 variable speed motor run at 30,000 rpm with a 20-mm rotor/stator sealed in a custom stainless flow-through chamber. The product was sealed and heated in a 90° C. oven until it became a low viscosity liquid (about 3 hours). The product was then dried at 90° C. for 2 hours. The dried polymer was ground and molecular weights were measured as described hereinbelow.

$M_n=1080$; $M_w=2025$; $M_w/M_n=1.9$.

EXAMPLE 7

Preparation of a Low Polydisperse Partially Neutralized PAA from a Crosslinked Gel by Oxidative Degradation Without Shear The experiment described in Example 6 was repeated except that the sample was not homogenized. In this case, $M_n$ was 1435; $M_w$ was 3230; and $M_w/M_n$ was 2.6.

EXAMPLE 8–9

Preparation of a Low Polydisperse Partially Neutralized PAA from a Crosslinked Gel by Oxidative Degradation and Shear at High Solids The partial sodium salt of a crosslinked PAA (either as dry material available from The Dow Chemical Company as DRYTECH™ resin, or as an aqueous suspension prepared as described in U.S. Pat. No. 5,629,377, column 18) was blended with water and $H_2O_2$ (weight-to-weight ratio of PAA:$H_2O_2$ of 3:1 for the dry polymer and 2:1 for the suspension) using a Hosowkawa Bepex 6-inch (15-cm) Extrud-O-Mix homogenizer (model number EM-6-K5F424) run at 200 rpm. Dry polymer or the 30 weight percent aqueous suspension thereof was fed at a controlled rate into the homogenizer through a hopper while a mixture of water and hydrogen peroxide was fed into a liquid addition port immediately downstream from the hopper to fix the desired PAA:$H_2O_2$ ratio. The blended samples were collected, heated, dried and analyzed as shown in Table II.

TABLE II

| Sample | PAA/$H_2O_2$ | $M_n$ | $M_w$ | $M_w/M_n$ |
|---|---|---|---|---|
| dry polymer | 3 | 1810 | 4205 | 2.3 |
| suspension | 2 | 2305 | 5370 | 2.3 |

Molecular Weight and Polydispersity Measurements

The following procedure was used to determine $M_w$, $M_n$, and polydispersity for all of the polymers prepared in Examples 1–7. A Hewlett Packard HP1090A gel permeation chromatograph with refractive index detector Model 1047A and autosampler was used to calculate $M_w$, and $M_n$. The columns were supplied by Polymer Laboratories. A guard column (PL Aquagel-OH Guard 8 micron) was connected in series with 2 PL Aquagel-OH 30 8 micron GPC columns, operating range (PEO/PEG MW) of 100–30,000. Separation was carried out at 35° C., using an injection volume of 100 microliters, and a flow rate of 1.00 mL/min. The solvent was a Phosphate buffer pH=7, prepared by adding sodium hydrogen phosphate (1.204 g) and sodium nitrate (21.247 g) into a 1-L volumetric flask, then diluting the solids with 1 L of HPLC-grade water. The solution was stirred and 5 N NaOH was added dropwise until a pH of 6.98 to 7.05 was reached.

Data collection was done using a Model 750-P100, IBM computer; instrument software was Chemstation for LC, Hewlett-Packard revision A.05.01; GPC Software was PL Caliber for HP Chemstation from Polymer Laboratories, version 4.01, serial 1007. Calibration was done using polyacrylic acid-sodium salt standards purchased from Polymer Laboratories. The columns were calibrated using the following standards:

| | |
|---|---|
| $M_p$ = 1,250 | Batch No. 21423-1 |
| $M_p$ = 2,925 | Batch No. 21426-1 |
| $M_p$ = 7,500 | Batch No. 21428-1 |
| $M_p$ = 16,000 | Batch No. 21430-1 |
| $M_p$ = 28,000 | Batch No. 21432-1 | where $M_p$ is the peak molecular weight of the standard.

A portion of each standard (0.25% (w/v)) was dissolved into 5 mL of the phosphate buffer, and shaken for 30 minutes. The dissolved standards were then filtered, placed in autosample vials, and run through the GPC columns using the program described hereinabove. The Polymer Laboratories software was programmed to recognize narrow standards, the flow rate marker, and any other peak needed for a particular calibration curve. The curve was automatically calculated when the peaks, which corresponded to the $M_p$ of the standard, were chosen.

What is claimed is:

1. A method of preparing a low polydisperse, water-soluble polymer comprising the steps of:

a) hydrolyzing a water-swellable crosslinked polymer that contains covalently bonded hydrolyzable crosslinking groups to form a first water-soluble polymer; and b) oxidatively degrading the first water-soluble polymer to form a second water-soluble polymer that has a lower number average and weight average molecular weight and a lower polydispersity than the first water-soluble polymer.

2. The method of claim 1 wherein the crosslinking groups include ester crosslinking groups and the water-swellable polymer contains acid groups and acid salt groups.

3. The method of claim 2 wherein the first water-soluble polymer is oxidatively degraded in the presence of shear.

4. The method of claim 2 wherein the first water-soluble polymer is oxidatively degraded by a peroxide, a hydroperoxide, a dialkyl peroxide, a hypohalite, a hypohalous acid, an alkylhypohalite, a persulfate, a permanganate, a perhalate, oxygen, ozone, peracid, a perhalic acid, or a combination thereof, and at a pH in the range of about 2 to about 10.

5. The method of claim 4 wherein the first water-soluble polymer is oxidatively degraded under such conditions to achieve a $M_w$ of not greater than 12,000.

6. The method of claim 2 wherein the acid groups are carboxylic acid groups and the acid salt groups are carboxylate groups, and wherein the first water-soluble polymer is oxidatively degraded by hydrogen peroxide or sodium hypochlorite.

7. The method of claim 6 wherein the crosslinked polymer is a crosslinked partial sodium salt of polyacrylic acid.

* * * * *